US012325425B2

(12) United States Patent
Ikeda (10) Patent No.: US 12,325,425 B2
(45) Date of Patent: Jun. 10, 2025

(54) ROAD MANAGEMENT SYSTEM, SERVER COMPUTER, AND ROAD MANAGEMENT METHOD

(71) Applicant: HITACHI, LTD., Tokyo (JP)

(72) Inventor: Kazuki Ikeda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 212 days.

(21) Appl. No.: 17/925,921

(22) PCT Filed: Jun. 24, 2021

(86) PCT No.: PCT/JP2021/023900
§ 371 (c)(1),
(2) Date: Nov. 17, 2022

(87) PCT Pub. No.: WO2022/049871
PCT Pub. Date: Mar. 10, 2022

(65) Prior Publication Data
US 2023/0174071 A1 Jun. 8, 2023

(30) Foreign Application Priority Data
Sep. 4, 2020 (JP) .................... 2020-149171

(51) Int. Cl.
*B60W 40/06* (2012.01)
*G08G 1/123* (2006.01)

(52) U.S. Cl.
CPC .......... *B60W 40/06* (2013.01); *G08G 1/123* (2013.01)

(58) Field of Classification Search
CPC ..... B60W 40/06; G08G 1/123; G08G 1/0112; G08G 1/0133; G08G 1/0141;
(Continued)

(56) References Cited

U.S. PATENT DOCUMENTS 10,036,639 B1 * 7/2018 Cox .................. G01S 19/42
10,094,671 B2 * 10/2018 Kondo ............... G01C 21/28
(Continued)

FOREIGN PATENT DOCUMENTS

JP 2012-216103 A 11/2012
JP 2014-164316 A 9/2014
(Continued)

OTHER PUBLICATIONS

JP2021037809A translation and original (Year: 2021).*
(Continued)

*Primary Examiner* — Frederick M Brushaber
(74) *Attorney, Agent, or Firm* — Miles & Stockbridge, P.C.

(57) ABSTRACT

A road manager system and method to identify a road surface property in a convenient and stable manner, including a vehicle positional information sensor and road surface condition sensor; a server computer that manages a road surface property; and a client computer that accesses the server computer. The server computer carries out processing of receiving, from the vehicle, permission information regarding provision of road surface condition information; receiving the road surface condition information transmitted from the vehicle, in which output information from the positional information sensor and output information from the road surface condition sensor are associated with each other; identifying, using output information from the road surface condition sensor, the road surface property of the road identified by the output information from the positional information sensor; and displaying the road surface property on the client computer in response to a request from the client computer.

9 Claims, 9 Drawing Sheets

(58) Field of Classification Search
CPC ....... G08G 1/096725; G08G 1/096741; G08G 1/096775; G08G 1/164; G08G 1/165; E01C 23/01
See application file for complete search history.

(56) References Cited

U.S. PATENT DOCUMENTS

| | | | | |
|---|---|---|---|---|
| 10,616,712 | B2* | 4/2020 | Ushiki | H04W 4/021 |
| 11,199,511 | B2 | 12/2021 | Kazuki et al. | |
| 11,609,307 | B2* | 3/2023 | Miki | G01S 7/4802 |
| 11,805,390 | B2* | 10/2023 | Viswanathan | G05D 1/0088 |
| 2007/0234502 | A1* | 10/2007 | Brobeck | G05D 1/0225 |
| | | | | 15/49.1 |
| 2013/0131976 | A1* | 5/2013 | Hubbard | G01C 21/30 |
| | | | | 701/412 |
| 2016/0013998 | A1* | 1/2016 | Coloney | H04L 47/70 |
| | | | | 709/224 |
| 2017/0011270 | A1* | 1/2017 | Kamada | G08G 1/096775 |
| 2017/0315556 | A1* | 11/2017 | Mimura | G05D 1/0061 |
| 2018/0349205 | A1* | 12/2018 | Kolluru | G06F 11/3024 |
| 2020/0042800 | A1 | 2/2020 | Kamada | |
| 2021/0109037 | A1* | 4/2021 | Ikeda | G01N 27/02 |
| 2023/0174071 | A1* | 6/2023 | Ikeda | G08G 1/165 |
| | | | | 701/1 |

FOREIGN PATENT DOCUMENTS

| | | | |
|---|---|---|---|
| JP | 2018012931 A | * | 1/2018 |
| JP | 2019-113462 A | | 7/2019 |
| JP | 2021037809 A | * | 3/2021 |
| WO | 2015129045 A1 | | 9/2015 |

OTHER PUBLICATIONS

Office Action mailed Oct. 24, 2023 in Japanese Application No. 2020-149171.
Search Report mailed Sep. 7, 2021 in International Application No. PCT/JP2021/023900.
Written Opinion mailed Sep. 7, 2021 in International Application No. PCT/JP2021/023900.

* cited by examiner

ESTIMATED PARTS FOR ROAD SURFACE CONDITION (FOR EXAMPLE, FIVE PARTS OF A TO E)

| ESTIMATED PARTS AND ESTIMATED ROAD SURFACE CONDITION | EXAMPLE 1 | EXAMPLE 2 | EXAMPLE 3 | EXAMPLE 4 | EXAMPLE 5 |
|---|---|---|---|---|---|
| A (LEFT LANE) | DRY | DRY | DRY | WET | WATERY |
| B (LEFT RUT) | DRY | WATERY | WET | WET | WATERY |
| C (LANE CENTER) | DRY | DRY | WATERY | WET | WATERY |
| D (RIGHT RUT) | DRY | WATERY | WET | WET | WATERY |
| E (RIGHT LANE) | DRY | DRY | DRY | WET | WATERY |
| DETERMINATION RESULT OF ROAD SURFACE PROPERTY | NORMAL | RUT | POTHOLE IN CENTER PORTION | RAINFALL | FLOOD |

ROAD MANAGEMENT SYSTEM, SERVER COMPUTER, AND ROAD MANAGEMENT METHOD

TECHNICAL FIELD

The present invention relates to technologies of a road management system, a server computer, and a road management method. The invention claims priority of Japanese Patent Application number 2020-149171, filed on Sep. 4, 2020, regarding the designated countries where incorporation with reference to the literature is permitted, the content of that application will be incorporated into the present application by reference.

BACKGROUND ART

PTL 1 describes a technology of sharing information of a road surface medium among a plurality of vehicles to each of which a medium identification sensor is applied, and executing traveling control such as maintaining a distance between the vehicles corresponding to the road surface medium.

CITATION LIST

Patent Literature

PTL 1: JP-A-2019-113462

SUMMARY OF INVENTION

Technical Problem

In the technology described in PTL 1, from a viewpoint of managing a road on which a vehicle travels, it is necessary to always secure the number of vehicles that can detect a road surface condition. In addition, even when road surface condition information is obtained as information related to traveling control, it may be not applicable to determine a road surface property such as a shape change related to road management.

An object of the invention is to provide a technology for a road manager to identify a road surface property in a convenient and stable manner.

Solution to Problem

The present application includes a plurality of systems that solve at least a part of the above problems. An example of the systems is as follows. In order to solve the above problems, a road management system according to an aspect of the invention includes: a vehicle at least a positional information sensor and a road surface condition sensor; a server computer that manages a road surface property of a road on which the vehicle travels; and a client computer that accesses the server computer. The server computer is provided with a calculation unit. The calculation unit is configured to (1) receive, from the vehicle, permission information regarding provision of road surface condition information, (2) receive the road surface condition information transmitted from the vehicle, in which output information from the positional information sensor and output information from the road surface condition sensor are associated with each other, (3) identify, using a plurality of pieces of the output information from the road surface condition sensor, the road surface property of the road identified by the output information from the positional information sensor, and (4) display the road surface property on the client computer in response to a request from the client computer.

Advantageous Effects of Invention

According to the invention, a road manager can identify a road surface property in a convenient and stable manner. Problems, configurations, and effects other than those described above will be clarified by description of the following embodiment.

DESCRIPTION OF EMBODIMENTS

Hereinafter, an embodiment of the invention will be described with reference to the drawings. In all the drawings for illustrating the embodiment, the same components are denoted by the same reference numerals in principle, and repetitive descriptions thereof may be omitted. In the following embodiment, it is needless to say that elements (including element steps and the like) are not necessarily essential unless otherwise particularly specified and considered as essential in principle. It is needless to say that expressions "formed of A", "implemented by A", "having A", and "including A" do not exclude elements other than A unless otherwise specified that A is the only element. Similarly, in the following embodiment, shapes, position relationships, and the like of elements and the like include those substantially approximate or similar to the shapes or the like unless otherwise particularly specified and considered in principle.

In the invention, a road surface condition indicates any of finite conditions classified in advance according to an influence observed by a vehicle traveling on a road surface, and includes a condition such as "dry", "wet", and "watery". The road surface condition is not limited to a water content, and may include a condition of an "oil film". A road surface property indicates any of finite conditions classified in advance according to an influence observed by a road manager who manages a road, and among road surface properties, a road surface property in which a shape is changed other than a normal condition is referred to as a change in shape. The change in shape includes, for example, a change in which a road surface height in a cross section of a lane changes, that is, a rut, a pothole in a center portion. The road surface property is not limited thereto, and includes a condition other than the change in shape, such as a rainfall condition and a flooded condition.

Figure 1:
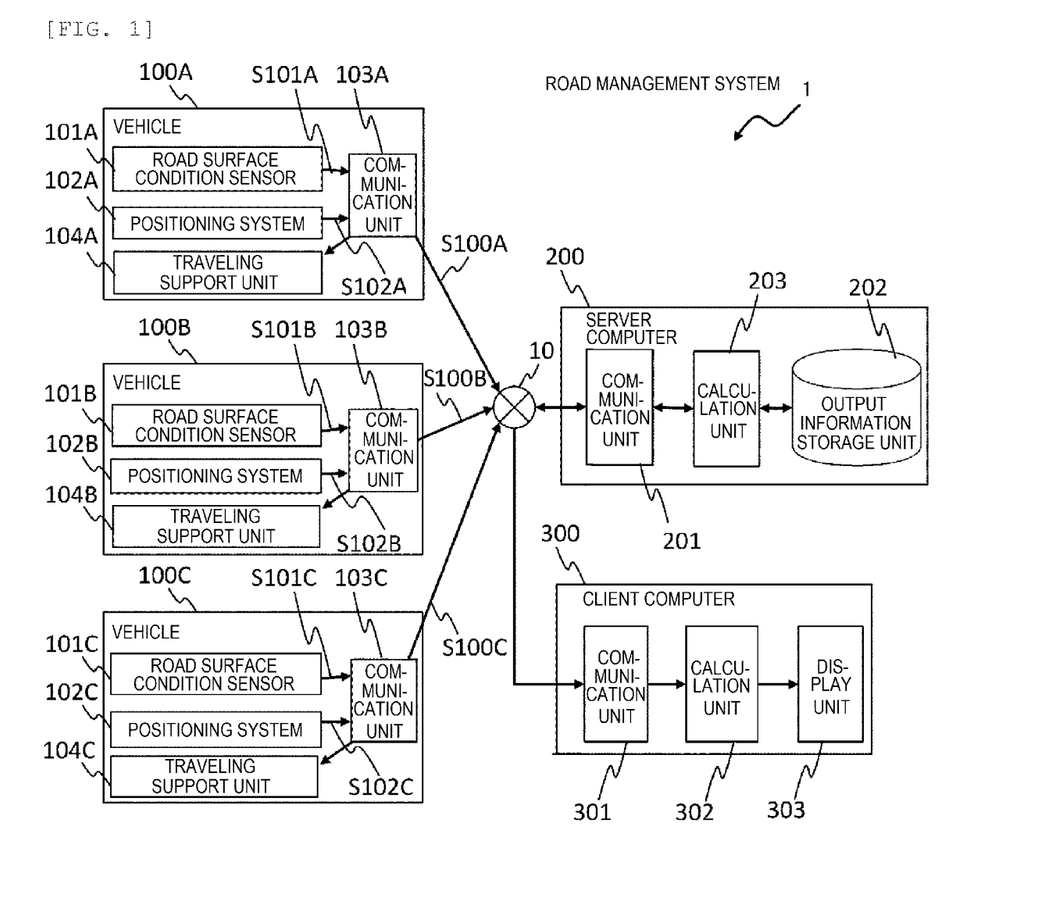
FIG. 1 is a diagram illustrating a configuration example of a road management system.

FIG. 1 is a diagram illustrating a configuration example of a road management system. A road management system 1 includes a plurality of vehicles 100A, 100B, and 100C, a network 10, a server computer 200, and a client computer 300. The vehicle is not limited to the vehicles 100A to 100C, and includes a larger number of vehicles, all of which have the same configuration as the vehicles 100A to 100C.

Specifically, the vehicle 100A includes a road surface condition sensor 101A, a positioning system 102A, a communication unit 103A, and a traveling support unit 104A. Similarly, the vehicle 100B includes a road surface condition sensor 101B, a positioning system 102B, a communication unit 103B, and a traveling support unit 104B. The vehicle 100C includes a road surface condition sensor 101C, a positioning system 102C, a communication unit 103C, and a traveling support unit 104C.

The road surface condition sensor 101A is a sensor that obtains a condition of a road surface medium. For example, the road surface condition sensor 101A identifies, based on an amplitude ratio and a phase difference between a traveling wave and a reflected wave for feeding an antenna, an impedance obtained by coupling of an electromagnetic field between a detected target (the road surface in the present embodiment) and the antenna, and outputs, to the communication unit 103A, the road surface condition such as dry, wet, and watery, which is predetermined output information, as a road surface condition signal S101A with reference to a sensor output information determination table 110 according to the impedance. The road surface condition sensor 101A is not limited thereto, and may be another sensor as long as the sensor can obtain output information corresponding to the road surface condition. The number of the road surface condition sensors 101A is not limited to one, and a plurality of road surface condition sensors 101A may be used as long as individual output information can be identified. Preferably, the road surface condition sensor 101A is provided at different locations of the vehicle 100A (for example, a plurality of locations in a tread direction of a front tire). For example, the vehicle 100A may be disposed such that the road surface condition sensor 101A is orthogonal to a traveling direction to detect road surface conditions of a center portion of the road, a rut portion of the road, and an outer side of the rut portion of the road. The same applies to the road surface condition sensor 101B and the road surface condition sensor 101C.

Figure 2:
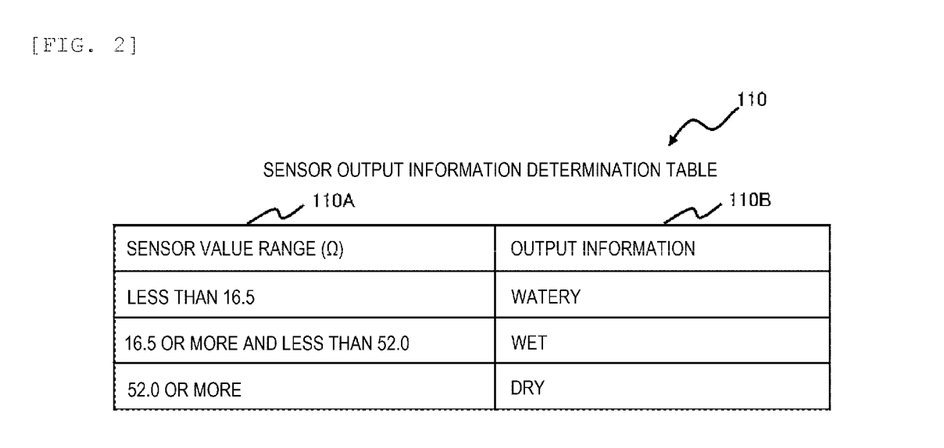
FIG. 2 is a diagram illustrating an example of a data structure of a sensor output information determination table.

FIG. 2 is a diagram illustrating an example of a data structure of a sensor output information determination table. The sensor output information determination table 110 is information included in the road surface condition sensor 101A, and the road surface condition sensor 101A uses the sensor output information determination table 110 when determining the output information based on the identified impedance. In the sensor output information determination table 110, a sensor value range (Ω) 110A and output information 110B are associated with each other.

In the sensor value range (Ω) 110A, a possible sensor value range is divided without overlapping or missing. For example, the sensor value is information for defining ranges divided as less than 16.5Ω, 16.5Ω or more and less than 52.0Ω, and 52.0Ω or more. The output information 110B is output information associated with the sensor value range.

The output information 110B is information indicating predetermined finite road surface conditions such as watery, wet, and dry.

The positioning system 102A is a positioning system of an existing technology, and for example, obtains positional information by using a satellite wave of a global positioning system (GPS) and the like, and outputs the positional information as a positional information signal S102A to the communication unit 103A. The positioning system 102A is not limited thereto, and may be a sensor of another system such as Global Navigation Satellite System (GLONASS), Beidou Navigation Satellite System, Galileo, and Blezuki, a sensor using base station information of a mobile phone or a wireless LAN, or a sensor using both of them as long as the sensor can obtain information for identifying a position. The same applies to the positioning system 102B and the positioning system 102C.

The communication unit 103A transmits road surface condition information, including the position information output from the positioning system 102A and the output information from the road surface condition sensor 101A, to the server computer 200 via the network 10. The same applies to the communication unit 103B and the communication unit 103C.

The traveling support unit 104A supports traveling of the vehicle 100A using the road surface condition information transmitted from the server computer 200 via the communication unit 103A. For example, when the road surface condition is watery, the traveling support unit 104A limits a traveling speed, controls an acceleration, or controls a steering angle. Alternatively, the traveling support unit 104A changes brake timing by applying a traveling algorithm in a watery mode during autonomous driving. The same applies to the traveling support unit 104B and the traveling support unit 104C.

The network 10 is a public network including the so-called Internet or a mobile phone network.

The server computer 200 includes a communication unit 201, a calculation unit 203, and an output information storage unit 202. The communication unit 201 communicates with another device via the network 10. Specifically, the communication unit 201 receives road surface condition information including the position information transmitted from the vehicle 100A, the vehicle 100B, and the vehicle 100C and output information from a road surface sensor. The communication unit 201 transmits, to the vehicle 100A, the vehicle 100B, and the vehicle 100C, road surface condition information estimated for a road in the vicinity of each vehicle in response to a request, and the road surface condition information is displayed on each vehicle.

Figure 3:
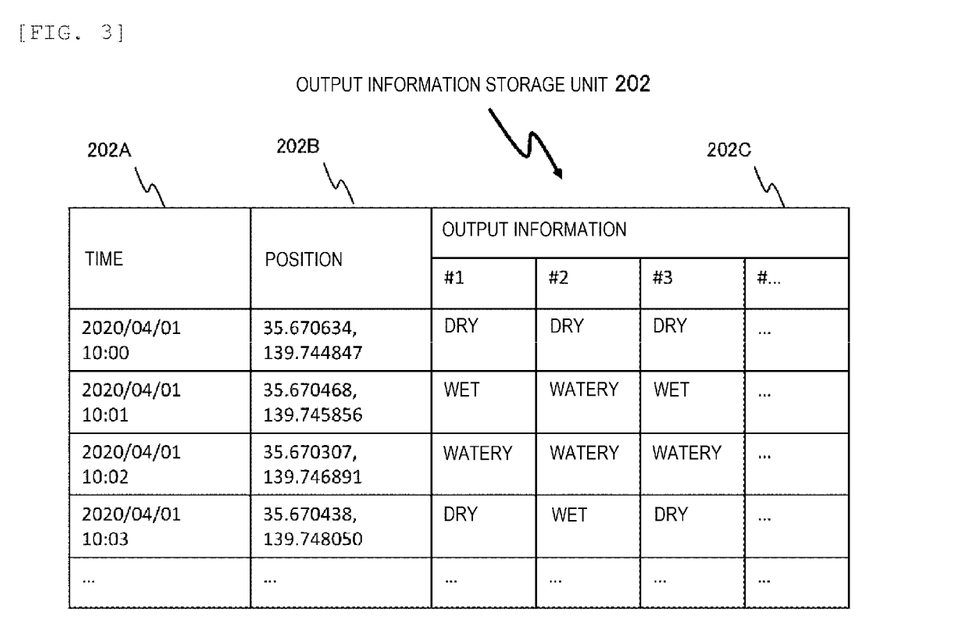
FIG. 3 is a diagram illustrating an example of a data structure of an output information storage unit.

FIG. 3 is a diagram illustrating an example of a data structure of an output information storage unit. The output information storage unit 202 stores information in which a time 202A, a position 202B, and output information 202C are associated with each other. In the time 202A, information for identifying days, hours, and minutes is stored. In the position 202B, coordinate information for identifying positions is stored. In the output information 202C, output information from, the road surface condition sensor 101A to the road surface condition sensor 101C that obtain information in association with substantially the same position (for example, latitude and longitude within a predetermined range) and substantially the same time (for example, the hour and minute are the same) is stored.

The calculation unit 203 executes output information registration processing, road surface property inspection processing and road surface property identification processing, which will be described later. The above processing includes the following processing.

(1) Receiving, from the vehicle, permission information regarding provision of the road surface condition information.

(2) Receiving the road surface condition information transmitted from the vehicle. The road surface condition information includes information in which output information from a positional information sensor and output information from road surface condition sensor are associated with each other.

(3) Identifying, using a plurality of pieces of the output information from the road surface condition sensor, a road surface property of a road identified by the output information from the positional information sensor.

(4) Displaying the road surface property on a client computer in response to a request from the client computer.

The calculation unit 203 further executes the following processing.

(5) Estimating, using the plurality of pieces of the output information from the road surface condition sensor, a road surface condition of the road identified by the output information from the positional information sensor.

(6) Transmitting, to the vehicle, the road surface condition estimated for the road in the vicinity of the vehicle in response to the request from the vehicle that transmits the permission information.

The client computer 300 is an information processing device such as a so-called personal computer, a tablet computer, or a smartphone, which includes a communication unit 301, a calculation unit 302, and a display unit 303. The communication unit 301 communicates with another device via the network 10. Specifically, the communication unit 301 transmits a request for road surface property information to the server computer 200, and the received road surface property information is displayed on the display unit 303. The calculation unit 302 controls execution of browser software and the like of the client computer 300. The display unit 303 displays various information display screens. Accordingly, the client computer 300 displays the screen by the browser software or the like after receiving display screen information transmitted from the server computer 200.

Figure 4:
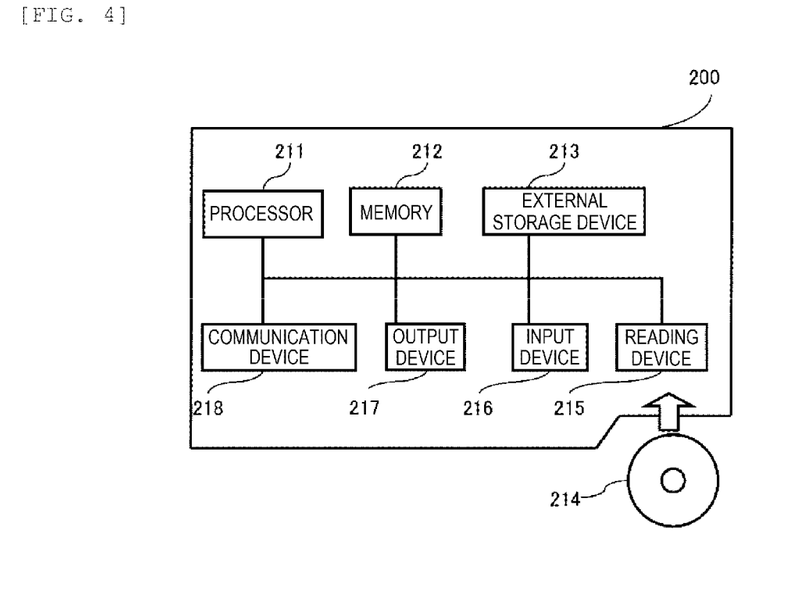
FIG. 4 is a diagram illustrating an example of a hardware configuration of a server device.

FIG. 4 is a diagram illustrating an example of a hardware configuration of a server computer. The server computer 200 may be implemented by a computer including a processor 211 such as a central processing unit (CPU) or a graphics processing unit (GPU), a memory 212, an external storage device 213 such as a hard disk drive (HDD), a reading device 215 that reads information from and writes information into a portable storage medium 214 such as a compact disk (CD) and a digital versatile disk (DVD), an input device 216 such as a keyboard, a mouse, and a barcode reader, an output device 217 such as a display, and a communication device 218 that communicates with another computer via a communication network such as the network 10, or the server computer 200 may be implemented by a computer system including a plurality of such computers.

For example, the calculation unit may be implemented by loading a predetermined program stored in the external storage device 213 into the memory 212 and executing the program by the processor 211. The output information storage unit 202 may be implemented by using the memory 212 or the external storage device 213 by the processor 211.

The predetermined program may be downloaded from the storage medium 214 to the external storage device 213 via the reading device 215, and then may be loaded into the memory 212 and executed by the processor 211.

Alternatively, the predetermined program may be directly loaded from the storage medium 214 into the memory 212 via the reading device 215 and executed by the processor 211.

The server computer 200 is not limited thereto, and may be implemented by, for example, an application specific integrated circuit (ASIC), a microcomputer, or any other semiconductor device as long as it is a subject that executes predetermined processing.

The client computer 300 also includes a hardware configuration similar to that of the server computer 200.

In the road management system 1, a plurality of vehicles traveling in various locations transmit the road surface condition information to the server computer 200 in association with the position and the date and time. The server computer 200 stores the road surface condition information. When there is a request from the client computer 300, the server computer 200 reads the road surface condition information, and identifies the road surface property for each position according to the predetermined algorithm. The client computer 300 maps and displays the road surface property information. Accordingly, it is possible to automatically collect, inspect, and display the road surface property information. In other words, the road management system 1 is one of Internet of Things (IoT) technologies in which the road surface condition sensor of the vehicle is used as an edge device. In the vehicle, the latest road surface condition information on the vicinity of an unreached position can be received from the server computer 200 as a return of providing the road surface condition information, and can be used for the traveling control.

Figure 5:
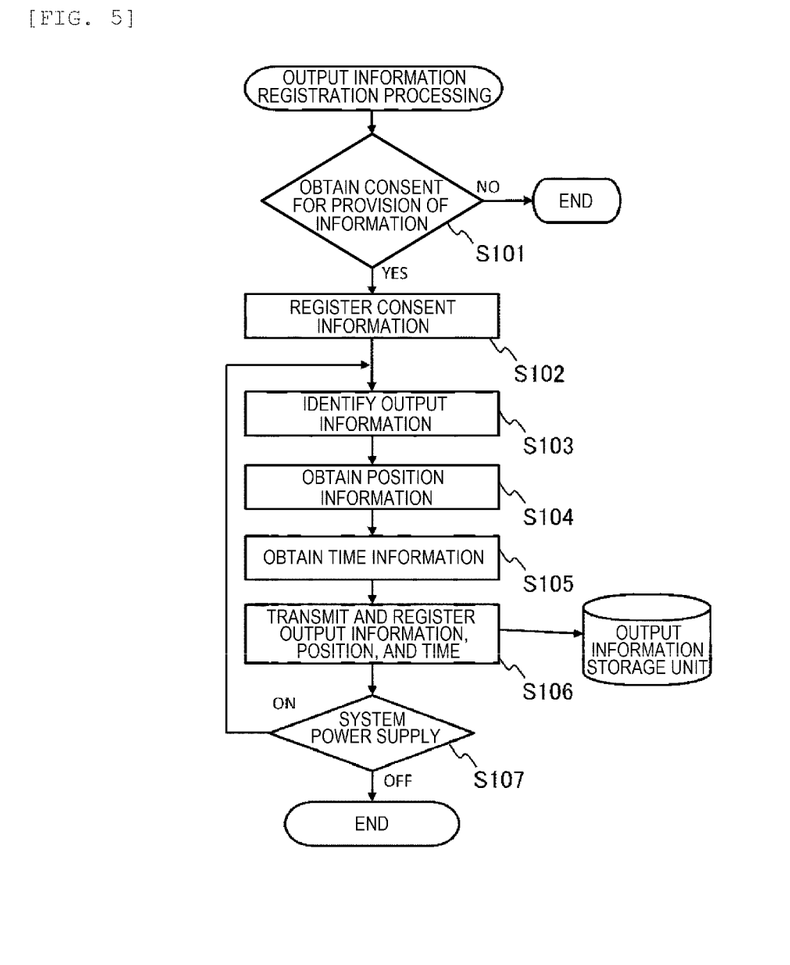
FIG. 5 is a diagram illustrating an example of a flowchart of output information registration processing.

FIG. 5 is a diagram illustrating an example of a flowchart of the output information registration processing. The output information registration processing is started when the vehicle 100A is started (activated or turned on).

First, the communication unit 103A obtains, from an occupant, consent for the provision of the road surface condition information (step S101). When the consent is not obtained ("NO" in step S101), the output information registration processing ends.

When the consent is obtained ("YES" in step S101), the communication unit 103A registers consent information (step S102). Specifically, the communication unit 103A transmits the consent information (permission information) and information for identifying the vehicle 100A to the server computer 200, and the calculation unit 203 of the server computer 200 stores the information in a storage unit not illustrated.

Then, the road surface condition sensor 101A identifies the output information (step S103). Specifically, the road surface condition sensor 101A outputs, to the communication unit 103A, the road surface condition such as dry, wet, and watery, which is the predetermined output information, as the road surface condition signal S101A with reference to the sensor output information determination table 110 according to the impedance corresponding to the road surface condition.

Then, the positioning system 102A obtains the position information (step S104). Specifically, the positioning system 102A obtains a coordinate using the satellite wave or the like, and outputs the coordinate to the communication unit 103A as the positional information signal S102A.

Then, the communication unit 103A obtains time information (step S105). Then, the communication unit 103A transmits road surface condition information including the output information, the position information, and the time information to the server computer 200, and executes registration by storing the road surface condition information in the output information storage unit 202 (step S106).

The communication unit 103A determines ON/OFF of a system power supply of the vehicle 100A (step S107). The communication unit 103A returns a control to step S103 when the system power supply ON, and ends the output information registration processing when the system power supply is OFF.

A flow of the output information registration processing is described above. According to the output information registration processing, the road surface condition information corresponding to the position and the date and time can be continuously obtained from the vehicle and be accumulated in the server computer 200.

A vehicle for which the consent information is registered in the output information registration processing can receive, from the server computer 200, the road surface condition estimated for the road in the vicinity of the vehicle in response to the request.

Figure 6:
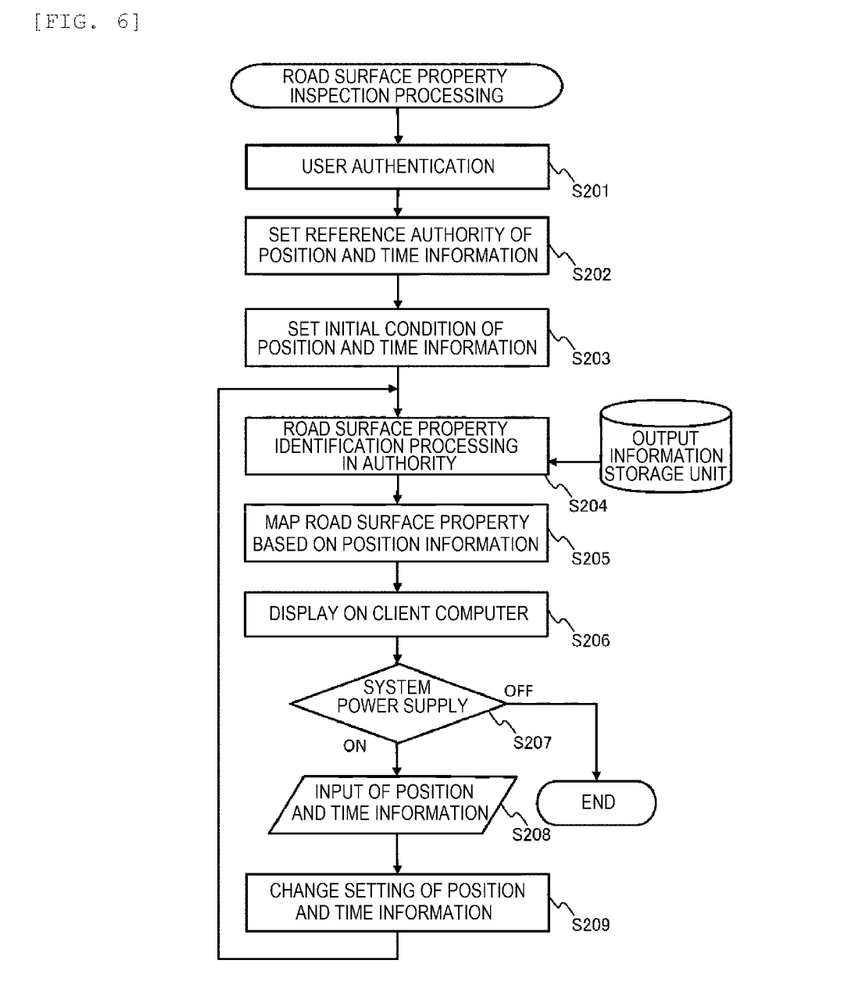
FIG. 6 is a diagram illustrating an example of a flowchart of road surface property inspection processing.

FIG. 6 is a diagram illustrating an example of a flowchart of the road surface property inspection processing. The road surface property inspection processing is started upon receiving the request from the client computer 300.

First, the calculation unit 203 executes user authentication (step S201). Specifically, the calculation unit 203 requests the client computer 300 to input user authentication information, receives the input, and determines whether a user is an appropriate user (user, road manager). Although not illustrated, when the user is not authenticated, for example, when a combination of a user ID and a password is not a predetermined combination, the calculation unit 203 ends the road surface property inspection processing.

Then, the calculation unit 203 sets a reference authority of the position and the time information (step S202). Specifically, the calculation unit 203 identifies the reference authority of the position and the time information according to a role or the like of an authenticated user, and sets the reference authority as login information. For example, when the user is a person responsible for a role of a reference authority of "2020 to 2030" of "Tokyo", the calculation unit 203 has the reference author of this region and this date and time as the login information.

Then, the calculation unit 203 sets an initial condition of the position and the time information (step S203). Specifically, according to the reference authority included in the login information of the user, the calculation unit 203 sets the position that is an initial value, that is, a predetermined position in an area to be referred to as an initial position, and sets the time information that is the initial value, that is, start date and time of a period to be referred to as initial time.

Then, the calculation unit 203 executes the road surface property identification processing in the authority (step S204). Specifically, the calculation unit 203 executes the road surface property identification processing that will be described later to identify the road surface property.

Then, the calculation unit 203 maps the road surface property based on the position information (step S205). Specifically, the calculation unit 203 matches the identified road surface property with the position information, and creates information in which the road surface property is superimposed on map information.

Then, the mapped road surface property information is transmitted to the client computer 300 by the calculation unit 203 and displayed on the display unit 303 (step S206).

The calculation unit 203 determines ON/OFF of a system power supply of the client computer 300 (step S207). When the system power supply is OFF, the calculation unit 203 ends the road surface property inspection processing.

When the system power supply is ON, the calculation unit 203 receives an input of the position and the time information in the client computer 300 (step S208), changes the setting of the position and the time information according to the received information (step S209), and returns a control to step S204.

A flow of the road surface property inspection processing is described above. According to the road surface property inspection processing, the road surface property can be estimated, displayed and inspected by using accumulation of information of continuously obtaining the road surface condition information corresponding to the position and the date and time from a general vehicle without using a dedicated vehicle (probe car) that measures the road surface property.

Figure 7:
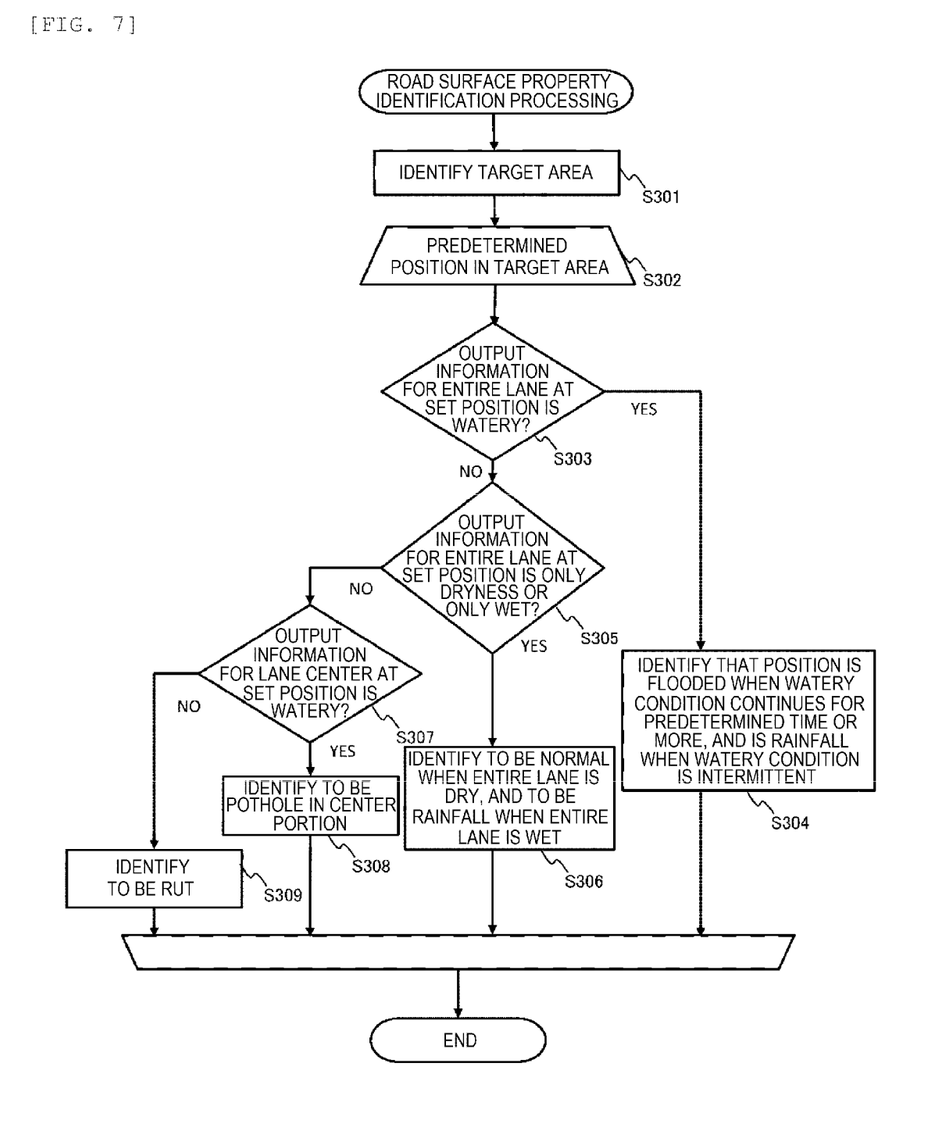
FIG. 7 is a diagram illustrating an example of a flowchart of road surface property identification processing.

FIG. 7 is a diagram illustrating an example of a flowchart of the road surface property identification processing. The road surface property identification processing is started in step S204 of the road surface property inspection processing.

First, the calculation unit 203 identifies an area to be a target for which the road surface property is identified (step S301). Specifically, the calculation unit 203 extracts, as a target area, a road within a predetermined range (for example, within a radius of 100 m) from a reference position in which the road surface property is identified.

Then, the calculation unit 203 repeatedly executes processing of steps S303 to S309 for each predetermined position in the target area (step S302). For example, the calculation unit 203 identifies the road surface property for each position, using, as a predetermined position, a representative point of a 1 m×1 m mesh that divides the road in the target area.

In the identification of the road surface property, the calculation unit 203 combines and handles the mesh of the cross section in the lane as the road surface, and identifies the property of this road surface. For example, the calculation unit 203 determines that the road surface property is "normal" when the entire road surface is dry, is "rut" when either a left rut or a right rut is watery and a lane center is dry, is the "pothole in the center portion" when a watery portion including the lane center and a dry portion are included, is "rainfall" when the entire road surface is wet, and is "flood" when a condition that the entire road surface is watery continues for a predetermined time or more (for example, one hour or more).

For the determination as described above, first, the calculation unit 203 determines whether the output information for the entire lane at the set position is watery (step S303). When the entire lane is watery ("YES" in step S303), the calculation unit 203 identifies that the position is flooded if the watery condition continues for the predetermined time or more, and is rainfall if the watery condition is intermittent (step S304).

When the entire lane is not watery ("NO" in step S303), the calculation unit 203 determines whether the output information for the entire lane at the set position is only dryness or only wet (step S305). When the entire lane is dry only or the entire lane is wet only ("YES" in step S305), the calculation unit 203 determines that the position is normal if the entire lane is dry, and is rainfall if the entire lane is wet (step S306).

When the entire lane is not dry only or the entire lane is not wet only ("NO" in step S305), the calculation unit 203 determines whether the output information for the lane center at the set position is watery (step S307). When the lane center is watery ("YES" in step S307), the calculation unit 203 identifies that the position has the pothole in the center portion (step S308). When the lane center is not watery ("NO" in step S307), the calculation unit 203 identifies that the position has the rut (step S309).

A flow of the road surface property identification processing is described above. According to the road surface property identification processing, the road surface property can be estimated and identified according to the road surface condition that is obtained by integrating road surface part information obtained by the road surface sensor. In the estimation of the road surface condition in the lane, the calculation unit 203 executes the estimation using the plurality of pieces of the output information from the road surface condition sensor by, for example, majority decision. Alternatively, the calculation unit 203 may execute the estimation by a random variable indicating the road surface condition.

Figure 8:
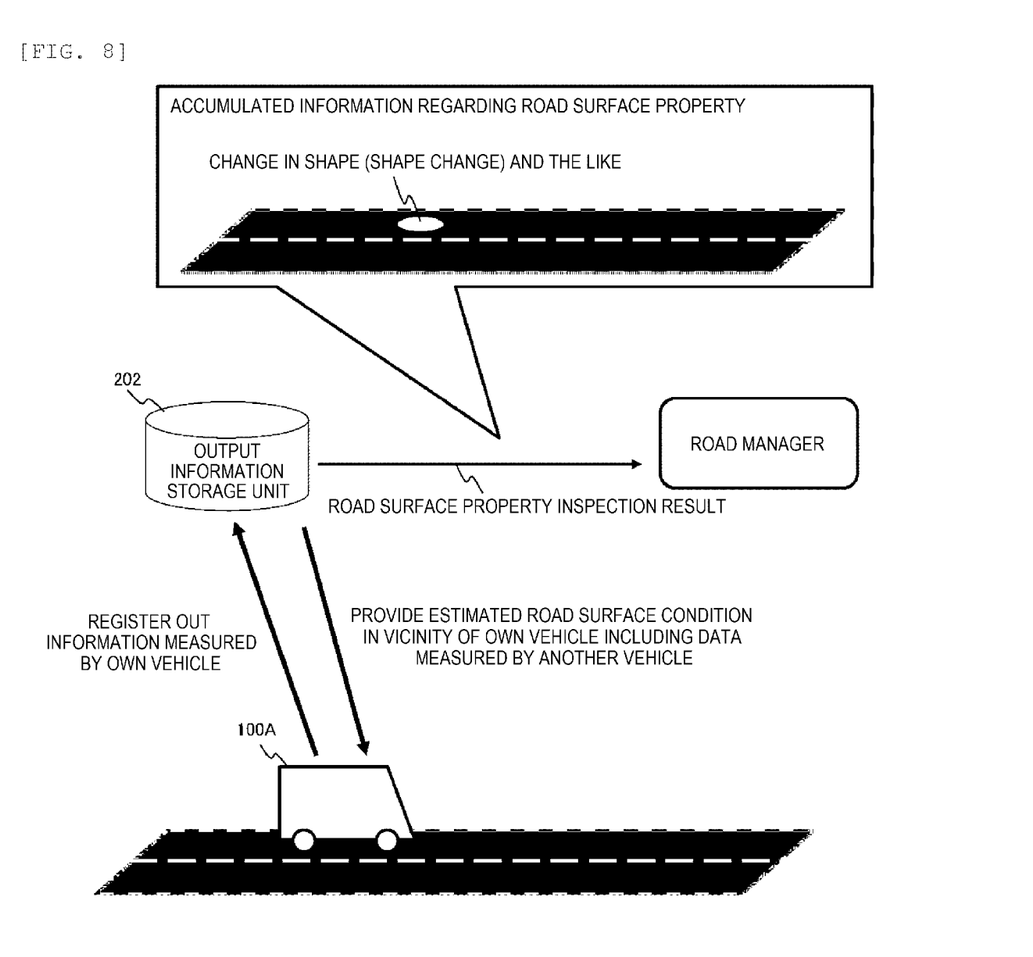
FIG. 8 is a diagram illustrating ac example of use of the road management system.

FIG. 8 is a diagram illustrating an example of use of the road management system. In the road management system 1, a support of a road surface property inspection work for the road manager and an information sharing support for a person who provides the road surface condition information may be implemented by using the above-described technical elements. The vehicle 100A can transmit output information measured by its own vehicle to the server computer 200 and accumulate the output information in the output information storage unit 202. As a return, the vehicle 100A can receive provision of an estimated road surface condition in the vicinity of its own vehicle including data measured by another vehicle, and use the road surface condition for traveling control and the like. The road manager accesses the server computer 200 in the client computer 300 to obtain a result obtained by estimating the road surface property information by using abundant information provided by the vehicle, and therefore, the road surface condition inspection work can be greatly reduced in labor and can be speeded up.

Figure 9:
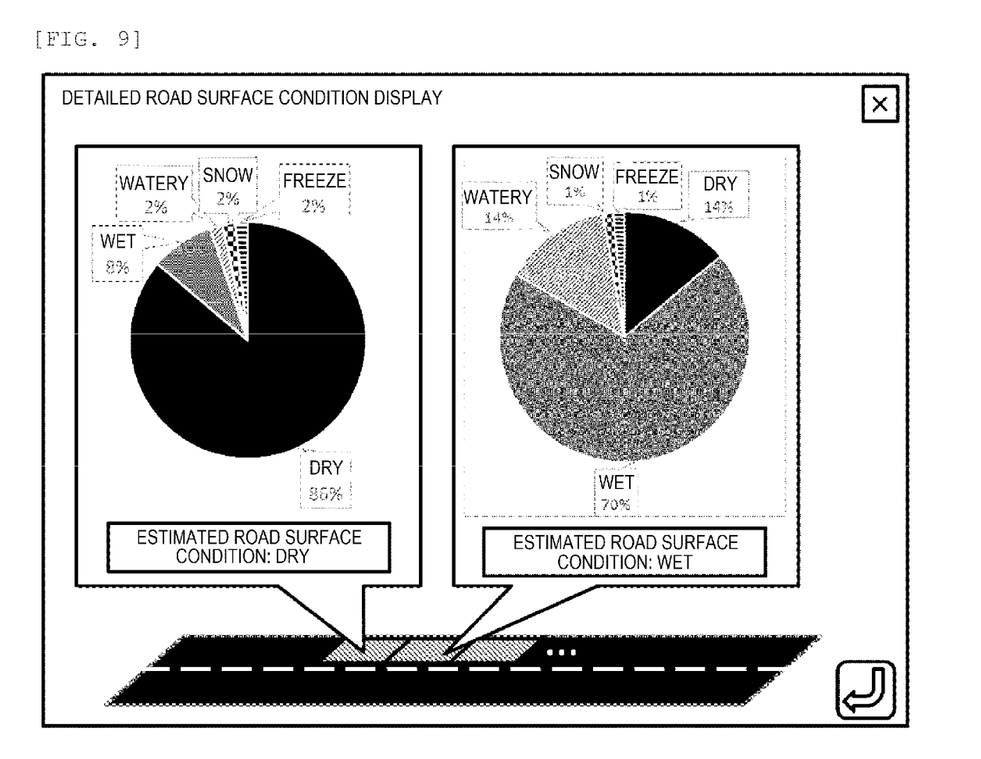
FIG. 9 is a diagram illustrating an example of a detailed road surface condition display screen.

FIG. 9 is a diagram illustrating an example of a detailed road surface condition display screen. The detailed road surface condition display screen is a screen created in the server computer 200 and displayed on the vehicle, and displays a result obtained by collecting, for a predetermined time, output information registered by plurality of sensors and estimating the road surface condition by the predetermined algorithm for the predetermined position. At that time, the result is not limited to the estimated road surface condition for each position, and details of the collected output information may be indicated by a pie chart or the like.

Figure 10:
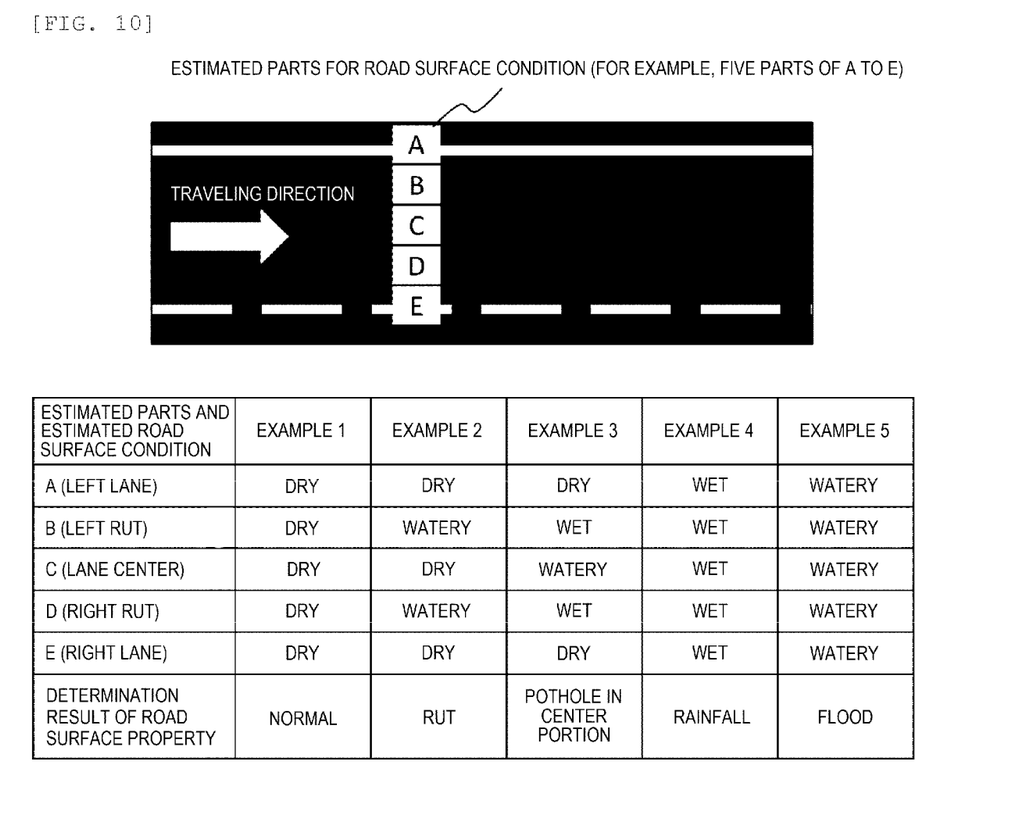
FIG. 10 is a diagram illustrating art example of road surface property determination.

FIG. 10 is a diagram illustrating an example of road surface property determination. The lane of the road is divided into parts A to E (A: left lane, B: left rut, C: lane center, D: right rut, E: right lane)) in order from a road side in a direction crossing the lane of the road, and the traveling vehicle 100A detects each part using the road surface condition sensor 101A. For example, the road surface condition of each of the parts A to E can be estimated by executing the majority decision using information obtained by detecting the parts A to E of the road surface by a plurality of vehicles. Examples 1 to 5 lists examples of estimated results.

Example 1 is an example which the road surface conditions of all of A to E are estimated to be dry. In this case, the road surface property is determined to be "normal". Example 2 is an example in which the road surface conditions of A, C, and E are estimated to be dry, and the road surface conditions of B and D, which are the rut portions, are estimated to be watery. In this case, the road surface property is determined to be "rut". Example 3 is an example in which the road surface conditions of A and E (outer sides of the rut portion) are estimated to be dry, the road surface conditions of B and D (rut portions) are estimated to be wet, and the road surface condition of C (lane center) is estimated to be watery. In this case, the road surface property is determined to be "pothole in the center portion". Example 4 is an example in which the road surface conditions of all of A to E are estimated to be wet. In this case, the road surface property is determined to be "rainfall". Example 5 is an example in which the road surface conditions of all of A to E are estimated to be watery. When this watery condition continues for a predetermined time (for example, one hour) or more, the road surface property is determined to be "flood".

An embodiment according to the invention is described above. According to the embodiment according to the invention, the road manager can identify the road surface property in a convenient and accurate manner.

The embodiment described above is described in detail for easy understanding of the invention, and the invention is not necessarily limited to those including all the configurations described above. A part of configurations of the embodiment can be replaced with another configuration, and the configuration of the embodiment can also be added to a configuration of another embodiment. A part of the configurations of the embodiment may also be deleted.

The units, the configurations, functions, processing units, and the like described above may be partially or entirely implemented by hardware such as through a design using an integrated circuit. The units, configurations, functions, and the like described above may be implemented by software by a processor interpreting and executing a program that implements respective functions. Information such as a program, a table, and a file for implementing each function can be placed in a recording device such as a memory and a hard disk, or a recording medium such as an IC card, an SD card, and a DVD.

Control lines and information lines according to the embodiment described above indicate what is considered necessary for description, and not all the control lines and the information lines are necessarily shown in a product. In practice, it may be considered that almost all the configurations are connected to each other. As described above, the invention as described centering on the embodiment.

REFERENCE SIGNS LIST 10 network
100A, 100B, 100C vehicle
101A, 101B, 101C road surface condition sensor
102A, 102B, 102C positioning system
103A, 103B, 103C communication unit
S101A, S101B, S101C road surface condition signal
S102A, S102B, S102C positional information signal
S100A, S100B, S100C road surface condition signal associated with positional information
200 server computer
201 communication unit
202 output information storage unit
203 calculation unit 300 client computer
301 communication unit
302 calculation unit
303 display unit

The invention claimed is:

1. A road management system comprising:
a vehicle including at least a positional information sensor and a road surface condition sensor;
a server computer that manages a road surface property of a road on which the vehicle travels; and
a client computer that accesses the server computer, wherein
the server computer is configured to
(1) receive, from the vehicle, permission information regarding consent for provision of road surface condition information to the vehicle from the server computer;
(2) receive the road surface condition information transmitted from the vehicle, in which output information from the positional information sensor and output information from the road surface condition sensor are associated with each other;
(3) identify, using a plurality of pieces of the output information from the road surface condition sensor, the road surface property of the road identified by the output information from the positional information sensor;
(4) display the road surface property on the client computer in response to a request from the client computer;
(5) estimate, using the plurality of pieces of the output information from the road surface condition sensor, a wet/dry condition of a road surface medium identified based on the output information from the positional information sensor;
(6) transmit, to the vehicle, the condition of the road surface condition estimated for a road in a vicinity of the vehicle in response to a request from the vehicle that transmits the permission information; and
(7) provide traveling control of the vehicle based on the condition of the road surface condition estimated for the road in the vicinity of the vehicle.

2. The road management system according to claim 1, wherein
the server computer is further configured to identify, in the processing of identifying the road surface property, the road surface property of a region corresponding to an authority of a user transmitted from the client computer.

3. The road management system according to claim 1, wherein
the server computer is further configured to identify, in the processing of identifying the road surface property, the road surface property using the information from the road surface condition sensor corresponding to a position on the road.

4. The road management system according to claim 1, wherein
the server computer is further configured to identify, in the processing of identifying the road surface property, that the road surface property is flood when the road surface condition of an entire lane on the road is in a watery condition and continues for a predetermined time.

5. The road management system according to claim 1, wherein
in the vehicle, the road surface condition sensor detects road surface conditions of a center portion of the road, a rut portion of the road, and an outer side of the rut portion of the road.

6. The road management system according to claim 1, wherein
the road surface condition sensor detects, using an antenna, an impedance of the antenna that changes according to a road surface condition in a vicinity of the antenna, and uses a road surface medium in the vicinity of the antenna as output information according to the impedance.

7. The road management system according to claim 1, wherein
the server computer estimates, in the processing of estimating the road surface condition, the road surface condition by determining a majority decision value using a plurality of pieces of the output information from the road surface condition sensor for each of a plurality of vehicles.

8. A server computer, wherein
the server computer is configured to:
receive, from a vehicle, permission information regarding consent for provision of road surface condition information to the vehicle from the server computer via a network;
receive the road surface condition information transmitted from the vehicle, in which output information from a positional information sensor and output information from a road surface condition sensor of the vehicle are associated with each other;
identify, using a plurality of pieces of the output information from the road surface condition sensor, the road surface property of the road identified by the output information from the positional information sensor;
display the road surface property on the computer in response to a request from a predetermined computer via the network;
estimate, using the plurality of pieces of the output information from the road surface condition sensor, a wet/dry condition of a road surface medium identified based on the output information from the positional information sensor;
transmit, to the vehicle, the road surface condition estimated for a road in a vicinity of the vehicle in response to a request from the vehicle that transmits the permission information; and
provide traveling control of the vehicle using the condition of the road surface condition estimated for the road in the vicinity of the vehicle.

9. A road management method using a server computer, the method comprising:
receiving, from a vehicle, permission information regarding consent for provision of road surface condition information to the vehicle from the server computer via a network;
receiving the road surface condition information transmitted from the vehicle, in which output information from a positional information sensor and output information from a road surface condition sensor of the vehicle are associated with each other;
identifying, using a plurality of pieces of the output information from the road surface condition sensor, the road surface property of the road identified by the output information from the positional information sensor;

displaying the road surface property on the computer in response to a request from a predetermined computer via the network;

estimating, using the plurality of pieces of the output information from the road surface condition sensor, a wet/dry condition of a road surface medium identified based on the output information from the positional information sensor;

transmitting, to the vehicle, the road surface condition estimated for a road in a vicinity of the vehicle in response to a request from the vehicle that transmits the permission information; and providing traveling control of the vehicle using the condition of the road surface condition estimated for the road in the vicinity of the vehicle.

* * * * *